Nov. 4, 1924.
J. TANNENBAUM
1,513,771
CUFF LINK
Filed July 19, 1923
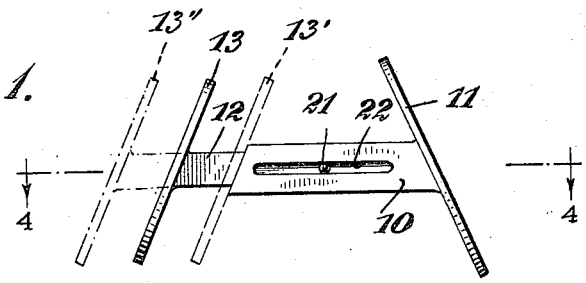
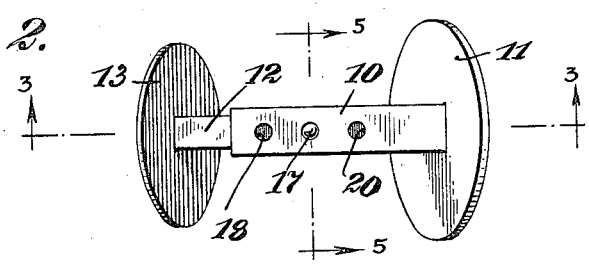
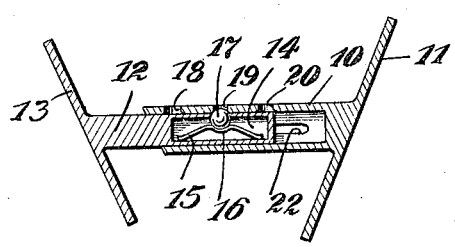
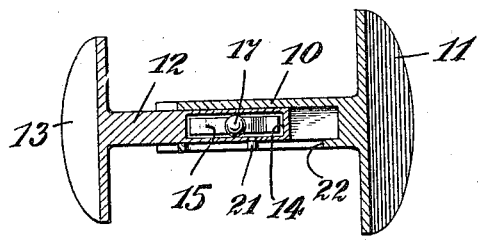
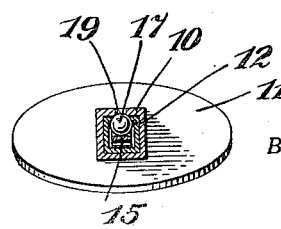
INVENTOR
Joseph Tannenbaum
BY
his ATTORNEY Patented Nov. 4, 1924.

1,513,771

UNITED STATES PATENT OFFICE.

JOSEPH TANNENBAUM, OF NEW YORK, N. Y., ASSIGNOR TO ANNA DAVIS, OF NEW YORK, N. Y.

CUFF LINK.

Application filed July 19, 1923. Serial No. 652,466.

*To all whom it may concern:*

Be it known that I, JOSEPH TANNENBAUM, a citizen of the United States, residing at New York city, county of New York, borough of Manhattan, and State of New York, have invented new and useful Improvements in Cuff Links, of which the following is a full, clear, and exact specification.

My invention relates to cuff-links and refers particularly to extensible cuff-links.

The proper spacing of the edges of cuffs of different sizes, as well as their proper adaptation to wrists or arms of varying sizes, requires cuff-links having varying shank lengths, in order to accommodate them in the various conditions.

It is also frequently desirable that cuffs be drawn upwardly without the removal of the cuff-links.

The device of my invention possesses the above valuable properties as well as others which will be evident upon a consideration of my specification and drawings.

The device of my invention comprises a pair of telescopic shanks each carrying a head with ball means whereby the shanks may be locked to each other at predetermined extensible positions while allowing of a desired telescopic movement of the two shanks.

In the accompanying drawings illustrating one form of the device of my invention, similar parts are designated by similar numerals.

Figure 1 is a side view of one form of my device showing a plurality of spacing between the heads.

Figure 2 is a top plan view of Figure 1.

Figure 3 is a cross-section through the line 3—3 of Figure 2.

Figure 4 is a cross-section through the line 4—4 of Figure 1.

Figure 5 is a cross-section through the line 5—5 of Figure 3.

The particular form of the device of my invention, shown in the accompanying drawings, comprises an exterior shank 10 carrying the head 11 and the interior shank 12 telescopically positioned within the shank 10 and carrying the head 13.

Positioned within the chamber 14 of the shank 12 is a flat spring 15 having a depression 16 within which rests a steel ball 17, the spring 15 pressing the ball 17 partially through an opening in the wall of the chamber 14, the hole being of such a size as to prevent the passage of the ball 17 therethrough.

The wall of the shank 10 has a plurality of openings 18, 19, 20 into which the ball 17 will extend by action of the spring 15.

A stop pin 21, carried by the shank 12 and extending through the slot 22 of the shank 10 prevents the complete separation of the two shanks 10 and 12.

It will thus be seen that when the shanks 10 and 12 are telescoped until the ball 17 rests within the opening 20 of the shank 10, the two heads will be locked in the positions 11 and 13′ of Figure 1; when the ball 17 rests within the opening 19 of the shank 10, the two heads will be in the positions 11 and 13 of Figure 1; and when the ball 17 rests within the opening 18 of the shank 10, the two heads will be in the positions 11 and 13″ of Figure 1.

The telescopic movement of the two members of the device readily releases the ball 17 from one hole contact and allows of freedom of movement, whereas the ball acts as an effective locking means for maintaining the two elements in a predetermined position with respect to each other.

It is evident that there may be only one ball opening in the shank 10, in which case, this hole is so positioned with respect to the ball that the insertion of the latter will lock the device in a desired spaced position of the heads 11 and 13, the telescopic movement of the two elements increasing, or decreasing, this spacing.

It is further evident that the stop pin 21 and the slot 22 may be eliminated if a separable cuff-link device is desired.

From the above it will be seen that the device of my invention presents a cuff-link which can be effectively locked in a predetermined head spacing which is capable of easy extension or reduction.

I do not limit myself to the particular size, shape, number or arrangement of parts, as shown and described, as these are given simply as a means for clearly describing my invention.

What I claim is:—

1. In a cuff-link, in combination, two telescopic shanks, a head carried by the outwardly extended portion of each shank and movable ball means whereby the two shanks may be locked in a predetermined position with respect to each other.

2. In a cuff-link, in combination, two telescopic shanks, a head carried by the outwardly extending portion of each shank, a movable ball carried by one shank and openings capable of receiving the ball carried by the other shank.

3. In a cuff-link, in combination, two telescopic shanks, a head carried by the outwardly extended portion of each shank, a movable ball carried by one shank, openings capable of receiving the ball carried by the other shank and means for preventing the separation of the two shanks.

4. In a cuff-link, in combination, two telescopic shanks, a head carried by the outwardly extended portion of each shank, a movable ball carried by one shank and means capable of receiving the ball carried by the other shank.

5. In a cuff-link, in combination, two telescopic shanks having openings therein, a head carried by the extended portion of each shank, a movable ball carried by one shank capable of extension through the openings in both shanks.

6. In a cuff-link, in combination, an exterior shank having a plurality of openings, a head carried by the exterior shank, an interior telescopic shank having an opening therein, a head carried by the interior shank and a movable ball carried by the interior shank and capable of placement within the plurality of openings in the exterior shank locking the two shanks.

7. In a cuff-link, in combination, an exterior shank having a plurality of openings, a head carried by the exterior shank, an interior telescopic shank having an opening therein, a head carried by the interior shank, a movable ball carried by the interior shank and capable of placement within the plurality of openings in the interior shank locking the two shanks and means for maintaining engagement between the ball and the exterior shank.

8. In a cuff-link, in combination, an exterior shank having a plurality of openings, a head carried by the exterior shank, an interior telescopic shank having an opening therein, a head carried by the interior shank, a movable ball carried by the interior shank and capable of placement within the plurality of openings in the exterior shank locking the two shanks, spring means for maintaining engagement between the ball and the exterior shank and means for preventing the separation of the two shanks.

Signed at New York city in the county of New York and State of New York this 18th day of July, 1923.

JOSEPH TANNENBAUM.